UNITED STATES PATENT OFFICE 2,275,741

1,4-NAPHTHOQUINONE COMPOUNDS AND MATERIAL COLORED THEREWITH

Joseph B. Dickey and James G. McNally, Rochester, N. Y., assignors to Eastman Kodak Company, Rochester, N. Y., a corporation of New Jersey No Drawing. Application December 9, 1939, Serial No. 308,457

7 Claims. (Cl. 260—345)

This invention relates to the art of dyeing or coloring. More particularly it relates to furan amino 1,4-naphthoquinone compounds and the application of the nuclear unsulfonated compounds for the coloration of organic derivatives of cellulose, especially cellulose acetate silk by dyeing, printing, stenciling or like methods.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

It is an object of our invention to provide a new class of 1,4-naphthoquinone dye compounds. Another object of our invention is to provide a process for the coloration of organic derivatives of cellulose. A further object is to provide colored organic derivative of cellulose textile materials which are of good fastness to light and washing. A still further object is to provide a satisfactory process for the preparation of the new 1,4-naphthoquinone dye compounds of our invention.

The 1,4-naphthoquinone compounds of our invention by means of which the above objects are accomplished or made possible are characterized in that they contain a furan amino group. These compounds have, for the most part, the probable general formula:

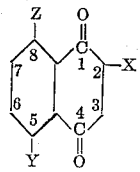

wherein X represents a furan amino radical and Y and Z each represents a member selected from the group consisting of a hydroxy group, a furan-, an alkyl-, a cycloalkyl-, an allyl-, an aralkyl-, an aryl- and a heterocyclic-amino group. The 1,4-naphthoquinone compounds of our invention can contain substituents in addition to the amino substituents mentioned. Illustrative of such substituents may be mentioned alkyl, alkoxy and halogen.

The substituted 1,4-naphthoquinone compounds of our invention can be prepared by reacting 5,8-dihydroxy-1,4-naphthoquinone, leuco 5,8-dihydroxy-1,4-naphthoquinone or a mixture of 5,8-dihydroxy-1,4-naphthoquinone and leuco 5,8-dihydroxy-1,4-naphthoquinone with a furan amine. In those cases where the 1,4-naphthoquinone nucleus contains both the residue of a furan amine and another amine such as an alkylamine, a cycloalkyl amine, allylamine, an arylamine, an aralkylamine and a heterocyclic amine, the reaction may be carried out using a mixture of a furan amine and one or more of the amines just mentioned, or stepwise. Where this latter procedure is employed the 5,8-dihydroxy-1,4-naphthoquinone compound may first be caused to react with a furan amine and then with the desired amine, or with an amine, other than a furan amine, and then with the desired furan amine. The reaction may be carried out in an inert solvent or diluent medium such as methanol, ethanol, butanol, carbitol, water, pyridine and dimethylaniline. Substituents such as halogen, alkyl and alkoxy can be introduced into the 1,4-naphthoquinone nucleus by methods known for the introduction of such groups.

While our invention relates broadly to substituted 1,4-naphthoquinone compounds containing a furan amino group, it relates more particularly to substituted 1,4-naphthoquinone compounds in which the furan amino group is selected from the group consisting of those having the general formulae:

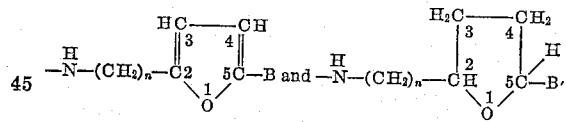

wherein B represents hydrogen, —(CH$_2$)$_x$OH or —(CH$_2$)$_x$NH$_2$, wherein $x$ represents a whole number above zero, and $n$ is a small whole number above zero.

Examples of furan amines employed in the process of our invention include

Furfurylamine

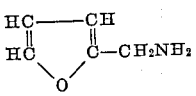

β-furylethylamine

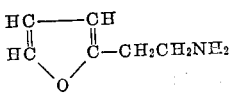

and γ-furylpropylamine

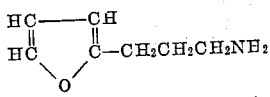

Hydrogenated derivatives of the above compounds such as tetrahydrofurfurylamine

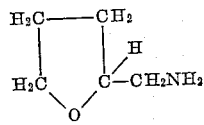

and β-tetrahydrofurylethylamine

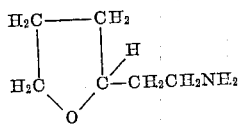

for example, likewise may be employed in the process of our invention.

The term "alkyl" as used herein and in the claims, unless otherwise indicated, includes not only unsubstituted alkyl groups such as a methyl group, an ethyl group, a propyl group or a butyl group but also substituted alkyl groups such as β-hydroxyethyl, β-hydroxypropyl, β,γ-hydroxypropyl, γ-hydroxypropyl, Δ-hydroxybutyl, β-methoxyethyl, β-ethoxyethyl, β'-methoxy-β-ethoxyethyl, β-chloroethyl, γ-chloropropyl, β-sulfoethyl, γ-sulfopropyl, β-sulfatoethyl,

or

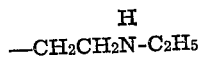

for example.

Illustrative cycloalkylamines include cyclohexylamine and cyclobutylamine. Illustrative arylamines include, for example, aniline, α-naphthylamine, o-m-p-anisidine, o-m-p-toluidine, o-m-p-phenylene diamine, o-m-p-phenetidine, 1-amino-5-naphthol and o-m-p-aminophenol. Similarly, illustrative aralkylamines include benzylamine and phenylethylamine. Heterocyclic amines which can be employed include, for example, aminopyridines, aminoquinolines, aminocarbazoles, aminoacridines and aminoacridones.

The nuclear unsulfonated compounds of our invention can be employed for the dyeing or coloration of organic derivatives of cellulose. The nuclear sulfonated compounds possess little or no utility for the dyeing of organic derivatives of cellulose but can be employed for the dyeing of wool and silk. Sulfonated compounds when desired can be prepared by sulfonation of the unsulfonated compounds in known fashion. Alternately the sulfonic group can be initially present in the 5,8-dihydroxy-1,4-naphthoquinone nucleus.

The following examples illustrate the preparation of the 1,4-naphthoquinone compounds of our invention.

*Example 1*

19 grams of 5,8-dihydroxy-1,4-naphthoquinone, 160 grams of a 40% aqueous solution of tetrahydrofurfurylamine and 1 gram of zinc dust are heated in a shaking autoclave at 50° C. for twenty hours. The crystalline reaction product resulting is recovered by filtration and washed with water. If desired, it can be purified by crystallization from a solvent such as acetic acid. The reaction product has the probable formula:

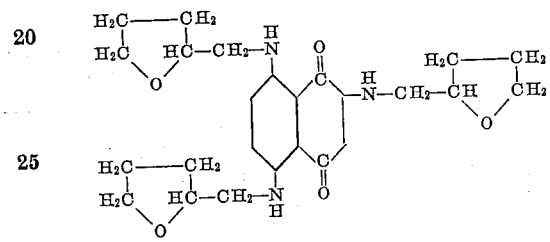

and colors cellulose acetate silk bluish-green shades.

Furfurylamine, β-furylethylamine and 5-ω-hydroxy-2-tetrahydrofurfurylamine, for example, can be substituted for the tetrahydrofurfurylamine of the example to obtain corresponding dye compounds which are included within the scope of our invention.

*Example 2*

19 grams of 5,8-dihydroxy-1,4-naphthoquinone, 160 grams of a 30% aqueous solution composed of equal molecular parts of γ-tetrahydrofurfurylpropylamine and tetrahydrofurfurylamine and 3 grams of boric acid are heated together in a shaking autoclave at 50° C. for 20 hours. The reaction product is worked up as described in Example 1 and has the probable formula:

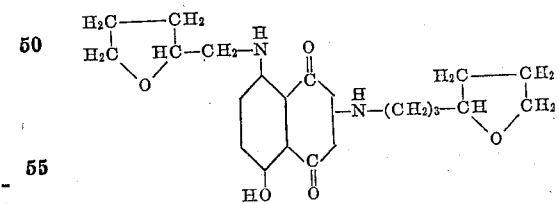

The product obtained by the foregoing reaction dyes cellulose acetate silk a bluish-red shade.

*Example 3*

19 grams of 5,8-dihydroxy-1,4-naphthoquinone, 160 cc. of a 35% aqueous solution composed of equal molecular parts of tetrahydrofurfurylamine and methylamine and 1 gram of zinc dust are reacted together and the reaction product is worked up as described in Example 1. The dye product obtained dyes cellulose acetate silk a bluish-green shade.

*Example 4*

19 grams of 6-methyl-5,8-dihydroxy-1,4-naphthoquinone, 160 grams of a 40% aqueous solution composed of equal molecular parts of tetrahydrofurfurylamine, methylamine and ethylamine and 1 gram of zinc dust are heated in an autoclave at 50-60° C. for 15 to 20 hours with agitation. The reaction product is worked up as described in Example 1 and has the probable formula:

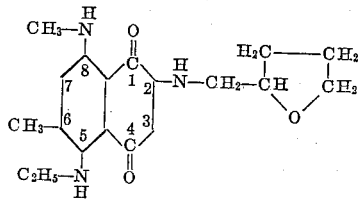

This dye product colors cellulose acetate silk a bluish-green shade.

*Example 5*

6 grams of leuco naphthazarine, 13 grams of 5,8-dihydroxy-1,4-naphthoquinone, 160 grams of a 40% aqueous solution composed of equal molecular parts of β-tetrahydrofurfurylamine, methylamine and ethanolamine are heated in an autoclave at 50-70° C. for 15 to 20 hours with agitation. The reaction product is worked up as described in Example 1. It dyes cellulose acetate silk a bluish-green shade.

The above reaction may be carried out, for example, using ethylamine, propylamine, isopropylamine or butylamine in place of methylamine and propanolamine (1,2 and 1,3), butanolamine (1,2; 1,3 and 1,4) and glycerylamine, for example, in place of ethanolamine. The reaction products thus obtained color cellulose acetate silk bluish-green shades. Similarly, the reaction can be carried out employing furfurylamine, β-furylethylamine or γ-furylpropylamine in place of β-tetrahydrofurfurylamine.

*Example 6*

19 grams of 5,8-dihydroxy-1,4-naphthoquinone and 1 gram of zinc dust are placed in 500 cc. of butanol to which has been added 25 grams of tetrahydrofurfurylamine, 25 grams of aniline and 25 grams of cyclohexylamine. The mixture is heated on a water-bath at 60-70° C. until no further color change takes place and the reaction mixture is then worked up as described in Example 1. The reaction product obtained dyes cellulose acetate silk a dischargeable bluish-green shade.

Cyclohexylamine in the above example can be replaced, for example, by benzylamine, o-, m- and p-anisidine and an aminophenol to obtain dye compounds which similarly color cellulose acetate silk greenish-blue and which are included within the scope of our invention.

*Example 7*

19 grams of leuco 5,8-dihydroxy-1,4-naphthoquinone are reacted in butanol with 15 grams of tetrahydrofurfurylamine, 15 grams of 2-aminopyridine and 10 grams of ethanolamine. When reaction is complete, air is passed into the reaction mixture to oxidize the leuco dye formed to the non-leuco form following which the reaction product is worked up as described in Example 1. Cellulose acetate silk is dyed a bluish-green shade by the dye product of this example.

Morpholine, 2-aminothiophene, 3-amino furan and aminocarbazole, for example, can be substituted for the 2-aminopyridine of the example to obtain dye compounds which color cellulose acetate silk bluish-green shades and which are included within the scope of our invention.

*Example 8*

19 grams of 5,8-dihydroxy-1,4-naphthoquinone, 160 grams of a 40% aqueous solution composed of equal molecular parts of sodium taurinate, tetrahydrofurfurylamine and laurylamine are reacted as described in Example 1. The dye compound formed by this reaction is salted out by the addition of sodium chloride, recovered by filtration, washed with water and dried. The reaction product obtained is water soluble and dyes cellulose acetate silk a bluish-green shade.

In place of sodium taurinate, the sodium salt of another alkylamino sulfonate can be employed to obtain dye compounds which color cellulose acetate silk bluish-green shades. Similarly, glycine may be so employed to obtain a dye compound which likewise dyes cellulose acetate silk a bluish-green shade.

*Example 9*

19 grams of 5,8-dihydroxy-1,4-naphthoquinone and 1 gram of zinc dust are placed in 300 cc. of butanol to which has been added 5 grams of ethylamine. The mixture resulting is heated on a water-bath at 60-70° C. until reaction is complete. 25 grams of tetrahydrofurfurylamine are then added and heating is continued at a temperature of 60-70° C. until reaction is complete, following which the reaction mixture is worked up as described in Example 1. The dye compound obtained colors cellulose acetate silk bluish-green.

It will be understood that the foregoing examples are intended to be illustrative and not limitative of our invention since many other compounds included within the scope of our invention can be prepared. Additional amine mixtures which can be reacted with 5,8-dihydroxy-1,4-naphthoquinone in accordance with the methods described herein to obtain dye compounds of our invention include, for example, furfurylamine and cyclohexylamine, γ-furylpropylamine, methylamine and ethanolamine, β-furylethylamine and β-chloroethylamine, β-tetrahydrofurfurylethylamine, β-methoxyethylamine and β-hydroxypropylamine and 5-β-hydroxyethyltetrahydrofurfurylamine and ethylamine.

The substituted 1,4-naphthoquinone dye compounds of our invention are, for the most part, relatively insoluble in water. Those compounds which are insoluble in water may be advantageously employed for the direct dyeing of organic derivative of cellulose textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material or materials to be dyed may be added to the dyebath and the dyeing operation conducted in known fashion. The dye compounds of our invention which are water soluble do not, of course, require the use of a dispersing or solubilizing agent but may be applied to organic derivatives of cellulose textile materials from an aqueous solution of the dye which may contain salt. For a more complete description as to how the water insoluble dye compounds of our invention may be employed in coloring operations, reference may be had to our U. S. Letters Patent No. 2,115,030, issued April 26, 1938. For a more detailed description as to how the water soluble dye compounds of our invention may be employed, reference may be had to our U. S. Letters Patent No. 2,107,898, issued February 8, 1938. The sulfonated dye compounds of our invention can be employed for the dyeing of wool and silk in accordance with methods known in the art for the coloration of these materials.

1,4-naphthoquinone compounds containing two different alkylamino groups are shown in Examples 4 and 5, for example. Compounds of this character are more particularly described and claimed in our copending application Serial No. 308,458, filed of even date herewith.

We claim:

1. A 1,4-naphthoquinone compound having the general formula:

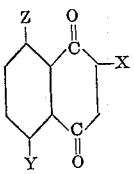

wherein X represents a furan amino radical and Y and Z each represents a member selected from the group consisting of a hydroxy group, a furan-, an alkyl-, a cycloalkyl-, an allyl-, an aralkyl-, an aryl- and a heterocyclic-amino group.

2. The 1,4-naphthoquinone compound having the formula:

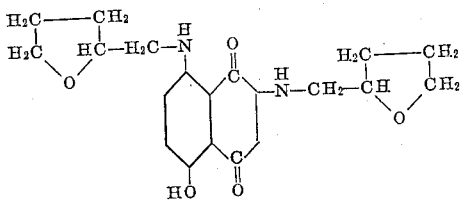

3. The 1,4-naphthoquinone compound having the formula:

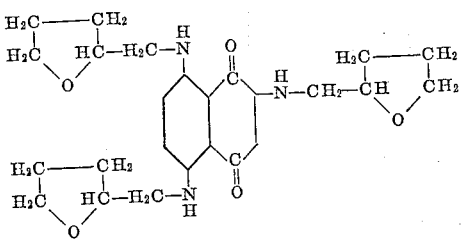

4. The 1,4-naphthoquinone compound having the formula:

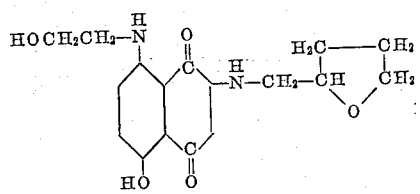

5. An organic derivative of cellulose textile material colored with a nuclear unsulfonated naphthazarine compound having the general formula:

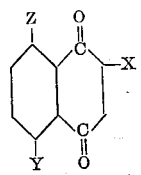

wherein X represents a furan amino radical and Y and Z each represents a member selected from the group consisting of a hydroxy group, a furan-, an alkyl-, a cycloalkyl-, an allyl-, an aralkyl-, an aryl- and a heterocyclic-amino group.

6. A cellulose acetate colored with a nuclear unsulfonated 1,4-naphthoquinone compound having the general formula:

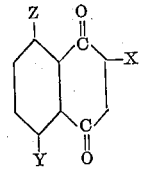

wherein X represents a furan amino radical and Y and Z each represents a member selected from the group consisting of a hydroxy group, a furan-, an alkyl-, a cycloalkyl-, an allyl-, an aralkyl-, an aryl- and a heterocyclic-amino group.

7. A 1,4-naphthoquinone compound having the formula:

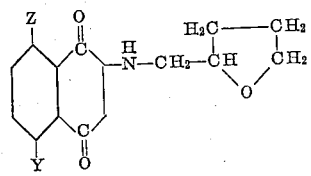

wherein Z and Y each represents a member selected from the group consisting of a hydroxy group, a furanamino group, an alkylamino group, a cycloalkylamino group, an allylamino group, an aralkylamino group, an arylamino group and a heterocyclicamino group.

JOSEPH B. DICKEY.
JAMES G. McNALLY.

CERTIFICATE OF CORRECTION.

Patent No. 2,275,741.                                   March 10, 1942.

JOSEPH B. DICKEY, ET AL.

It is hereby certified that error appears in the printed specification of the above numbered patent requiring correction as follows: Page 3, first column, line 22, for "naphthazarine" read --5,8-dihydroxy-1,4-naphthoquinone--; and that the said Letters Patent should be read with this correction therein that the same may conform to the record of the case in the Patent Office.

Signed and sealed this 26th day of May, A. D. 1942.

Henry Van Arsdale,
Acting Commissioner of Patents.

(Seal)